Nov. 8, 1955 N. A. SCHUSTER 2,723,375
INDUCTION LOGGING APPARATUS
Filed March 2, 1953 3 Sheets-Sheet 1
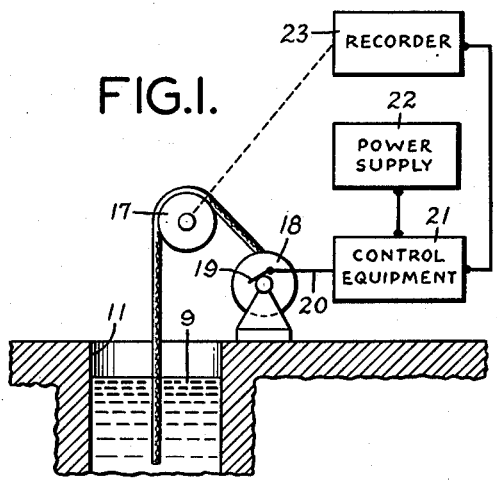
FIG.1.
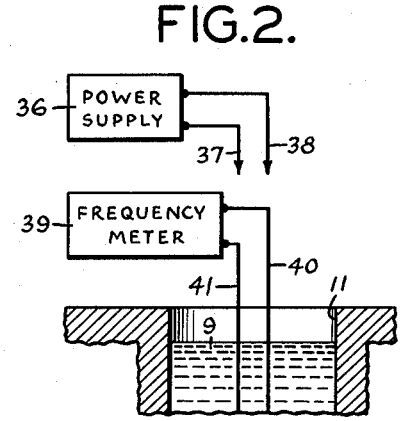
FIG.2.
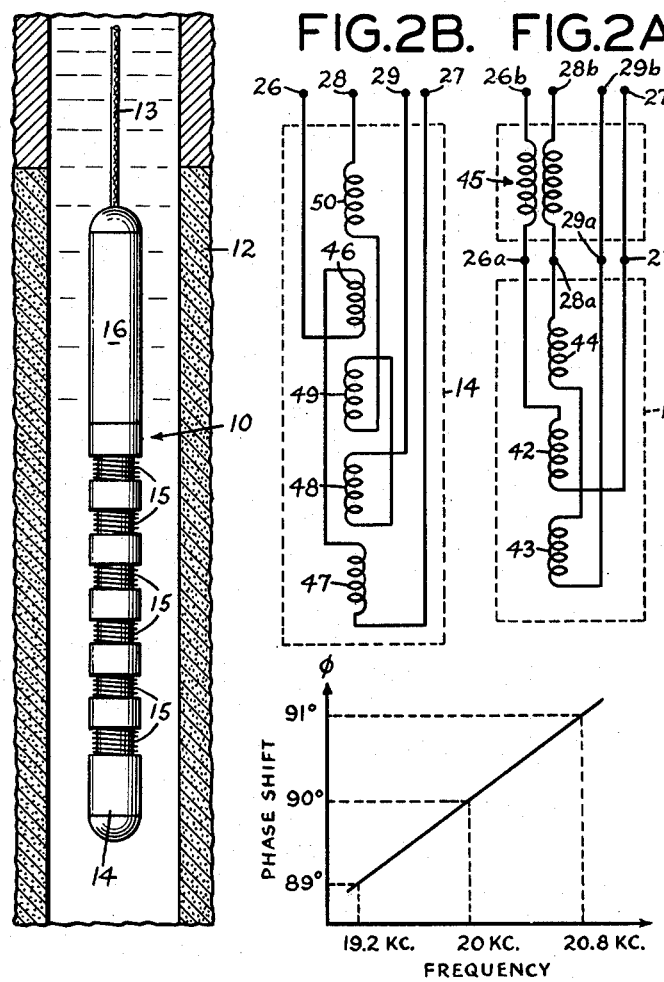
FIG.2B. FIG.2A.
FIG.3.
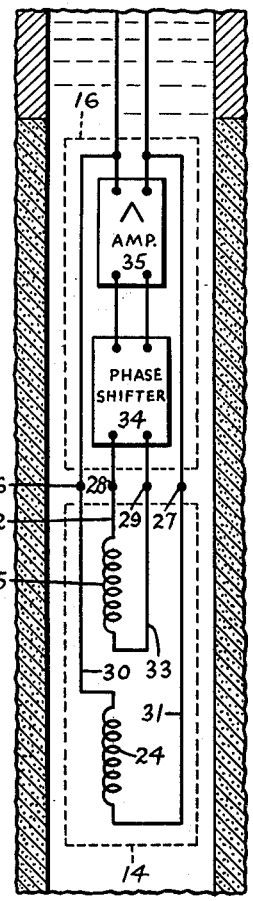
INVENTOR.
NICK A. SCHUSTER
BY
HIS ATTORNEYS.

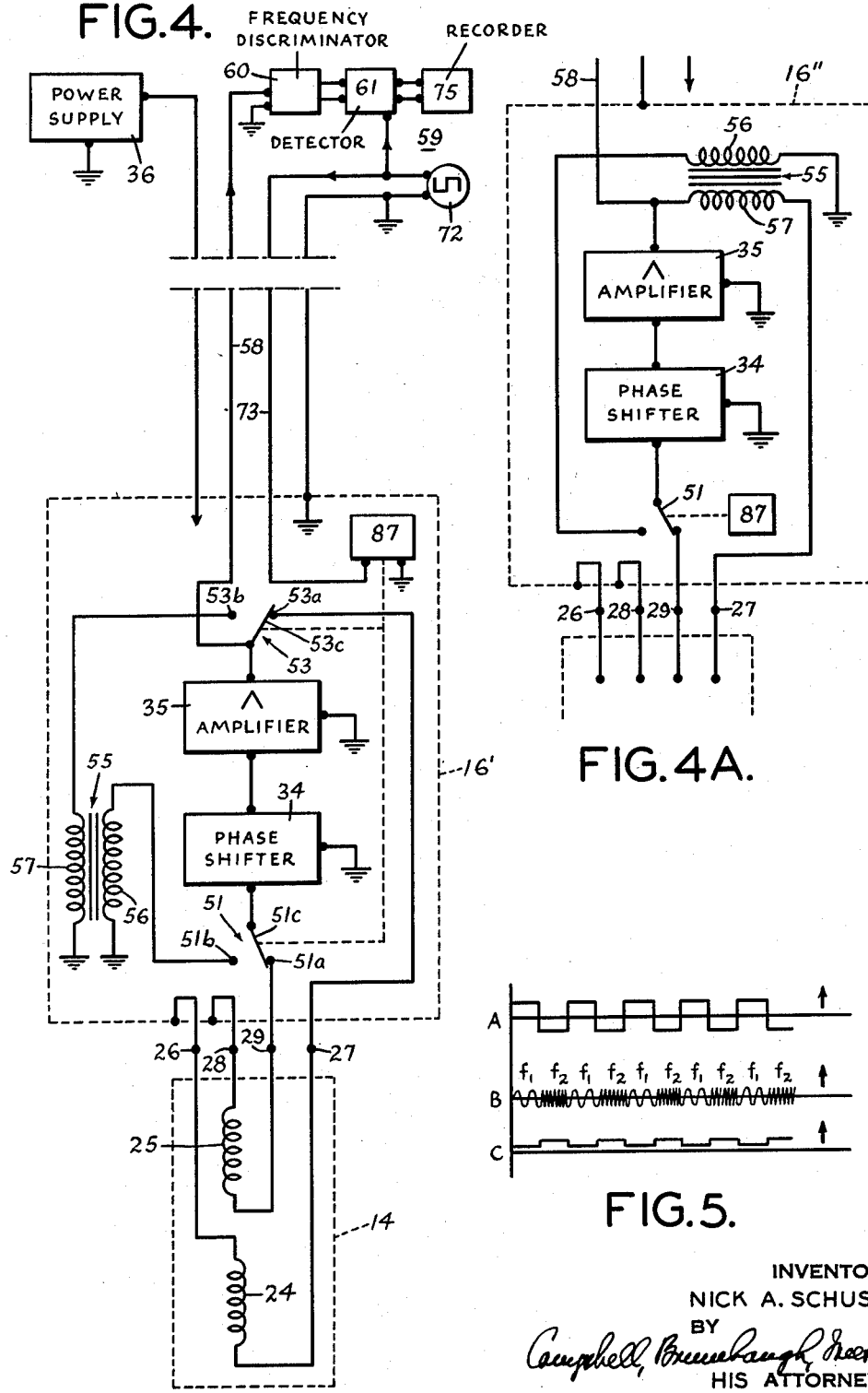
FIG.4.
FIG.4A.
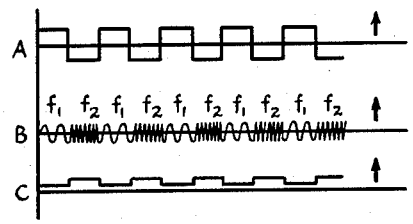
FIG.5.
INVENTOR.
NICK A. SCHUSTER
BY
Campbell, Brumbaugh  Greigrave
HIS ATTORNEYS.

United States Patent Office 2,723,375
Patented Nov. 8, 1955

2,723,375

INDUCTION LOGGING APPARATUS

Nick A. Schuster, Ridgefield, Conn., assignor to Schlumberger Well Surveying Corporation, Houston, Tex., a corporation of Delaware Application March 2, 1953, Serial No. 339,573

13 Claims. (Cl. 324—6)

The present invention relates to the electromagnetic investigation of the subterranean strata traversed by a bore hole and more particularly to a new and improved induction logging apparatus for obtaining indications of the electrical conductivity of the different earth formations through which the bore hole passes.

It has become accepted oil field practice to determine the electrical conductivity of earth formations traversed by a well by passing through the well a coil system comprising alternating current energized transmitter coil means disposed in fixed relation to receiver coil means for inductive coupling therewith, and observing the magnitude of a signal component in the output of the receiver coil means that has the same phase as the energizing current. Such systems have proven highly effective particularly when embodying focusing coil techniques of the type disclosed in Patents No. 2,582,314 for "Electromagnetic Well Logging System," and No. 2,582,315 for "Differential Coil System for Induction Logging," both issued January 15, 1952, to Henri-Georges Doll. For proper operation, it is usually necessary to include electronic equipment in the bore hole with the coil system. This equipment must be very carefully designed to be stable and sturdy and to meet the extremely difficult conditions of high temperature and pressure, lack of space, and remoteness of surface control and recording equipment which usually prevail in bore hole operations.

It is an object of the invention, accordingly, to provide new and improved induction well logging apparatus of the above character which embodies bore hole electronic equipment that is simpler in construction and has stability requirements that are less stringent than the equipment employed heretofore yet is capable of providing accurate indications of formation electrical conductivities.

In accordance with the present invention, transmitter coil means and receiver coil means in an induction logging system are connected to form with the surrounding earth formations a portion of a regenerative feedback path in self-sustaining oscillator means such that the frequency of the latter varies as a function of the physical properties of the formations. More specifically, the output of the receiver coil means is fed through high gain amplifier means to the input of the transmitter coil means in such a manner that electrical oscillations are sustained as a result of the regenerative feedback between the coils through the earth formations forming a portion of the electrical circuit by induction. The frequency of these oscillations will be a function of the electromagnetic properties of the earth formations, and, by properly selecting the characteristics of the electrical circuit, this frequency may be, for example, a direct function of the conductivity of the earth formations, which may thus be readily determined.

Where wide temperature variations in the bore hole may cause changes in the characteristics of the electrical circuits, giving rise to undesired frequency variations which would introduce errors into the conductivity measurements, the invention contemplates the provision of means for eliminating such errors. This may be accomplished, according to the invention, by providing a second feedback path including the high gain amplifier means, and obtaining indications of the difference in the frequencies of oscillation of the system first with one feedback path and then with the other. The second feedback path may include a dummy coil system not responsive to the properties of the earth formations. Alternatively, where a multiplicity of coils comprising in effect a plurality of induction logging coil systems are employed, one of said coil systems may constitute the second feedback path.

For a better understanding of the invention, reference is made to the following detailed description of several representative embodiments, taken in conjunction with the accompanying drawings, in which:

Fig. 1 is a schematic representation of a typical induction logging array along with a corresponding surface equipment;

Fig. 2 is a circuit diagram of a simplified embodiment of the invention;

Fig. 2A illustrates a modification of the embodiment shown in Fig. 2 for use when the induction logging coil systems are designed for zero mutual impedance;

Fig. 2B shows still another coil system which may be employed with the embodiment shown in Fig. 2;

Fig. 3 is a graph illustrating a typical relation between phase shift and frequency for the phase shifting means 34 in Fig. 2;

Fig. 4 is still another embodiment of the invention;

Fig. 4A is a modification of the embodiment shown in Fig. 4;

Fig. 5 is a graph employed to explain the operation of the electrical measuring circuit shown in Fig. 4;

Figures 6, 7:
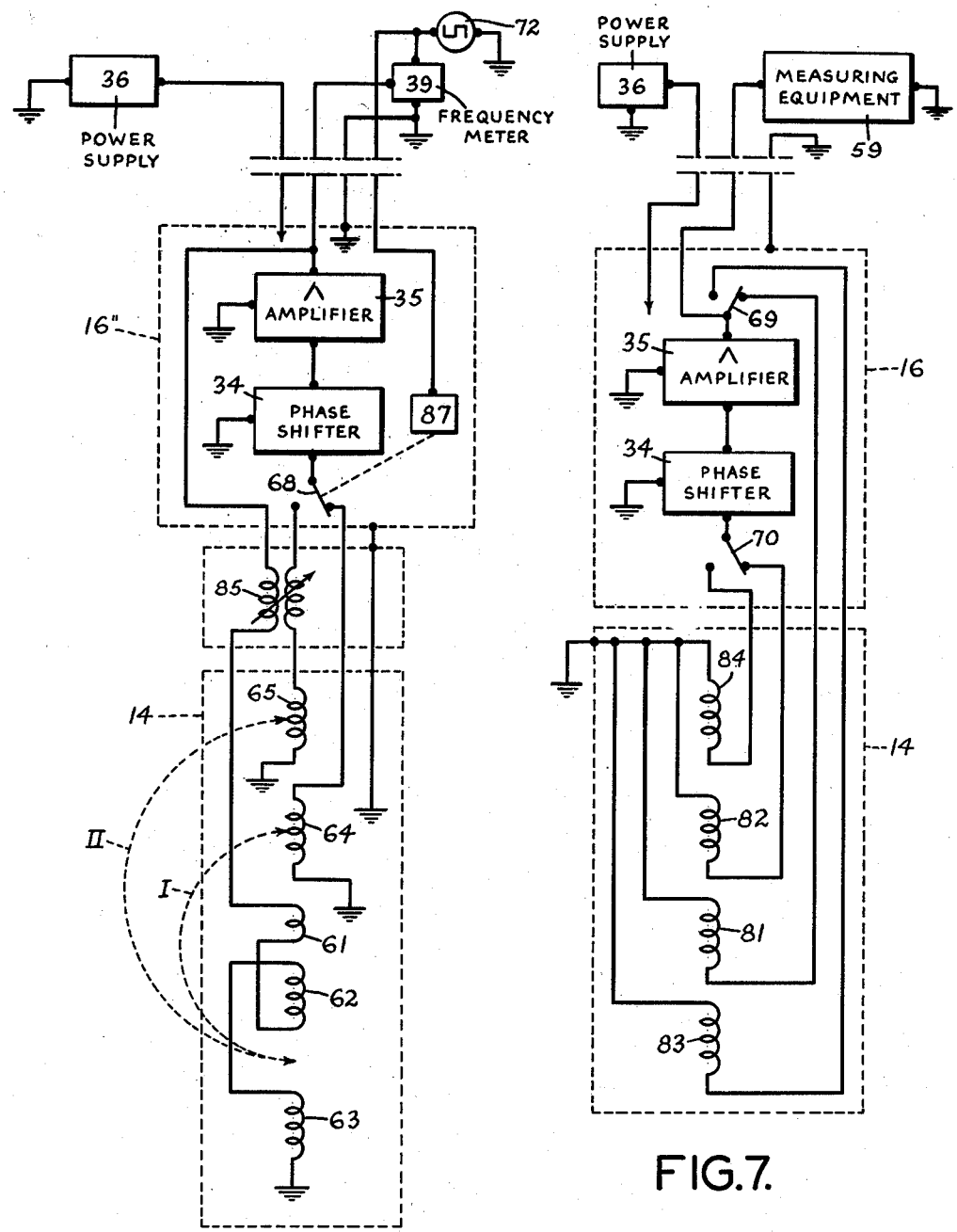
Fig. 6 is a schematic representation of an embodiment of the invention particularly adapted for use with focusing coil systems designed in accordance with the aforementioned patents.
Fig. 7 is a modification of the embodiment shown in Fig. 6, for another type of focusing coil system.

In Fig. 1, a typical induction logging array 10 is lowered by means of a conventional electrical cable 13 through a bore hole 11 traversing the earth formations 12. The bore hole 11 may be dry, or it may contain a relatively conductive or nonconductive drilling liquid 9, as shown. The induction logging array 10 may comprise a nonconductive, nonmagnetic housing 14 on which is wound a plurality of electrostatically shielded coils 15. Electrically and physically connected to the coil housing 14 is a pressure-resistant cartridge 16, which may house the bore hole portion of the electrical equipment necessary for the operation of the logging system.

At the surface of the earth, the cable 13 may be raised and lowered in the bore hole 11 by means of a conventional sheave 17 and a winch 18. The conductors in the cable 13 may be connected through slip rings 19 and a conductor 20 to the control equipment 21. The necessary power to operate the electronic equipment in the cartridge 16 and the coil system 15 may be supplied by a power supply 22 at the surface. The electrical indications obtained in the bore hole may also be recorded at the surface on conventional recording means 23 electrically connected to the control equipment 21 and mechanically driven from the sheave 17 so as to record measurements as a function of depth.

In the simplified form of the invention shown in Fig. 2, the coil housing 14 has wound thereon a transmitter coil 24 and a receiver coil 25. Desirably, there should be a relatively high level of mutual coupling between the transmitter coil and receiver coil circuits. The transmitter coil 24 is connected through the conductors 30 and 31, respectively, and the terminals 26 and 27, respectively, to the output terminals of a high gain amplifier 35. The receiver coil 25 is connected through the conductors 32 and 33, respectively, the terminals 28 and 29, respectively, and through phase shifting means 34 to the input terminals of the amplifier. It will be noted that the coil system and the phase shifting means 34 constitute a feedback path between the output and the input of the amplifier 35.

For oscillation at a given frequency, the phase shift through the feedback path (i. e., the sum of the phase shifts in the coil system and in the phase shifting means 34) must, of course, be equal and opposite to the phase shift through the amplifier. Additionally, the phase shift through the amplifier 35 should be substantially constant over the frequency range of interest, whereas the phase shift introduced by the phase shifting means 34 should be a predetermined function of frequency. Under these conditions, any variations in the phase of the output of the receiver coil 25 with respect to the current in the transmitter coil 24, caused by variations in the properties of the adjacent earth formations, will produce corresponding variations in the frequency of oscillation of the system.

In a practical system, the phase shift between the voltage input to the amplifier 35 and the current output therefrom might be zero over a given frequency range (say from 19 kc./sec. to 21 kc./sec.), in which case the phase shifting means 34 would be designed to introduce a phase shift for 90° lagging at a frequency of say, 20 kilocycles per second, to compensate for the 90° leading phase shift between the current in the transmitter coil 24 and the output voltage from the receiver coil 25 when only inductive coupling obtains between the coils. Also, the phase shifting means 34 might be designed so that a frequency change of say 4% will produce a one degree shift in phase, the relation being linear as illustrated in Fig. 3.

In operation, assume that the coil system is first suspended in air so that only inductive coupling exists between the transmitter coil 24 and the receiver coil 25. If the amplifier 35 is now energized, the entire system will break into oscillation at a frequency of 20 kilocycles per second. Under these conditions, the 90° leading phase shift introduced by the coil system is compensated by the 90° lagging phase shift introduced by the phase shifting means 34, so that the total phase shift through the feedback path is equal and opposite to the phase shift through the amplifier 35 (zero) as required to maintain the system in oscillation at a frequency of 20 kilocycles per second.

If now the logging array is lowered into a bore hole to the vicinity of a formation that is somewhat conductive, the phase shift between the voltage induced in the receiver coil 25 and the current in the transmitter coil will no longer be 90° leading, but will be somewhat greater than this. Since the mutual inductance between the coils 24 and 25 is very high, the change in phase shift will be very small. Further, since the magnetic susceptibility of earth formations is in general very low, the change in phase shift will be approximately proportional to the electrical conductivity of the media surrounding the coil housing 14. Suppose that the formation adjacent the coil housing 14 causes a one degree change in phase shift so that the phase shift between the current in the transmitter coil 24 and the voltage induced in the receiver coil 25 is 91°, the frequency of oscillation will automatically and instantaneously change to a new value for which the phase shifting means introduces a phase shift of −91°. From Fig. 3, the new frequency value is seen to be 20.8 kilocycles per second.

Therefore, as the logging array is lowered through the bore hole, the frequency of oscillation will be continuously a function of the conductivity of the material surrounding the coil system. This frequency may be measured at the surface of the earth by suitable means such as a conventional frequency meter 39 connected by the conductors 40 and 41 to receive the output of the amplifier 35. Thus, a continuous record of conductivity may be obtained as the logging array is moved through the bore hole.

The system illustrated in Fig. 2 has the advantage of simplicity and the further advantage that variations in the gain of the amplifier 35 caused by adverse bore hole conditions will not affect the measurements so long as oscillations are maintained.

Usually, the transmitter and receiver coils in an induction logging system are not closely coupled as in the embodiment shown in Fig. 2. On the contrary, it is standard practice to design coil systems for substantially zero mutual coupling under certain conditions. In a typical system shown in Fig. 2A, a transmitter coil 42 may be located symmetrically between two receiver coils 43 and 44 for zero mutual coupling. In such cases, separate means other than the coil system must be provided for coupling the transmitter and receiver coil circuits to provide an inductive signal in the latter that is both sufficiently large to maintain the system in oscillation and large as compared with the expected conductivity signal. Suitable means may comprise, for example, a transformer 45 coupling the transmitter and receiver coil circuits. Obviously, any other appropriate element capable of providing a substantially 90° coupling between the two circuits such as a capacitor, for example, may be provided in lieu of the transformer 45.

While relatively simple coil systems are shown in the feedback path in Figs. 2 and 2A, it will be understood that more complex coil systems may be employed, as, for example, any of the systems shown in the aforementioned patents to Henri-Georges Doll. One of these is shown in Fig. 2B and it comprises two transmitter coils 46 and 47 and three receiver coils 48, 49 and 50 constructed in accordance with the teachings of the aforementioned Doll Patent No. 2,582,314. In those coil systems designed for zero mutual coupling, separate mutual coupling means may be employed as described above in connection with Fig. 2A.

In the modification shown in Fig. 4, it is not necessary that the absolute value of the phase shift in the amplifier 35 be maintained constant. While this embodiment may utilize any of the coil systems mentioned above, it will be described, for simplicity, as having a simple two coil system of the type shown in Fig. 2. Referring to the figure, the terminals 28 and 29 of the receiver coil 25 are connected, respectively, to ground and to one fixed contact 51a of a switch 51, the movable arm 51c of which is connected through the phase shifting means 34 to the input circuit of the amplifier 35. The output of the amplifier 35 is applied to the movable arm 53c of a switch 53, which, in the position shown, engages a fixed contact 53a connected to the transmitter coil terminal 27.

With the switches 51 and 53 in the position shown, the system is essentially the same as that shown in Fig. 2 and it will function in essentially the same manner, its frequency of oscillation $f_1$ varying as a function of the conductivity of the material surrounding the coil housing 14.

In order to eliminate the effect of any variations in the phase shift present in the amplifier, the input circuit of the phase shifting means 34 and the output circuit of the amplifier 35 are adapted to be connected periodically to a device 55 having a constant phase shift of 90° leading. The device 55 may comprise, for example, a conventional transformer in which the voltage across the secondary winding 56 leads by 90° the current applied to the primary winding 57. The primary winding 57 has one terminal connected to ground and another terminal connected to the fixed contact 53b of the switch 53. The secondary winding of the transformer 55 also has one terminal connected to ground and another terminal connected to the fixed contact 51b of the switch 51.

When the switches 51 and 53 are moved to bring their movable contacts 51c and 53c, respectively, into engagement with the fixed contacts 51b and 53b, respectively, the output of the amplifier 35 is applied through the phase shifter device 55 and the phase shifting means 34 to the input circuit of the amplifier 35 and the system will oscillate at a predetermined frequency $f_2$. Thus, the phase shifter device 55 acts as a dummy coil system (as so-called hereinafter) and is preferably designed to have substantially the same mutual impedance characteristics as the logging coil system or the logging coil system with additional mutual coupling means as in Fig. 2A.

The switches 51 and 53 may be operated cyclically in synchronism by suitable means such as a mechanical rotator 87, for example, energized by an A. C. source 72 at the surface through the cable conductors 73 and 73a. A convenient cyclic rate of switching may be 15 cycles per second, for example. The output of the amplifier 35 may be transmitted to the surface of the earth through an insulated conductor 58 to suitable measuring equipment 59 capable of providing indications of the difference between the frequency $f_1$ of the oscillator with the logging coil system in the circuit and the frequency $f_2$ of the oscillator with the dummy coil system 55 in the circuit.

The measuring equipment 59 is preferably of the phase sensitive type and it may comprise, for example, a conventional frequency discriminator 60, the output of which is fed to a phase sensitive detector 61 which may be of the type disclosed in prior Patent No. 2,535,666 to Broding, for example. The detector 61 may be rendered phase sensitive and synchronized with the mechanical rotator means 87 by connecting it to receive a reference voltage from the source 72. Recording means 75 may be provided for recording the output of the detector 61.

The operation of the system shown in Fig. 4 will be better understood with reference to Fig. 5 on which are plotted with respect to time illustrative graphs of the various functions and voltages. The graph A is a plot of the switching times of the switches 51 and 53 which may be at a relatively low frequency, for example, 15 cycles per second, as aforementioned. During the first half cycle, the logging coil system is connected in the oscillator circuit and the frequency $f_1$, as shown in the graph B, is transmitted to the surface of the earth. During the next half cycle, the switches 51 and 53 connect the dummy coil system 55 in the oscillator circuit and the new oscillation frequency $f_2$ is transmitted to the surface of the earth. Therefore, as the logging coil system is lowered through the well, signals of frequencies $f_1$ and $f_2$ are alternately transmitted to the surface of the earth.

With the dummy coil system 55 in the amplifier feedback path, it will be apparent that the frequency of oscillation $f_2$ will be substantially constant unless an undesired variation in the phase shift of the amplifier 35 takes place and produces a corresponding change in frequency. On the other hand, when the logging coil system is in the amplifier feedback path, the frequency of oscillation $f_1$ will be a function both of the conductivity of the formations and of the undesired phase shift in the amplifier 35. However, the difference in frequency, $f_1-f_2$, will be substantially a function only of the conductivity of the material surrounding the logging coil system.

The signals of frequencies $f_1$ and $f_2$ are fed to the frequency discriminator 60 which provides an output of the general character represented by the curve C in Fig. 5, wherein the amplitudes during successive half cycles are proportional to the frequencies $f_1$ and $f_2$, respectively. This output is then fed to the detector 61 which gives a continuous D. C. output proportional to the difference in amplitude between peak and minimum values of the wave C. This difference in amplitude, which is recorded by the recording means 75, is proportional to the difference between the frequencies $f_1$ and $f_2$, which, in turn, is proportional to the conductivity of the material surrounding the logging coil system. Thus, there is shown in Fig. 4 a simple circuit requiring a minimum of equipment in the bore hole, which equipment is substantially unaffected by the adverse conditions usually prevailing in bore hole operations.

In order to obtain the correct frequency deviation, it is not necessary that the amplitudes of the mutual impedances during each half cycle be substantially the same as suggested above, but this is desirable in order that the amplifier 35 may operate at substantially the same gain during both half cycles.

If desired, the primary winding 57 of the dummy coil system 55 may be continuously connected in series with the transmitter coil 24, as shown in Fig. 4A. This makes it possible to eliminate the switch 53. As in Fig. 4, the switch 51 alternately connects the receiver coil terminals 28 and 29 and the secondary winding 56 of the dummy coil system 55 to the input circuit of the phase shifting means 34.

In focusing coil systems of the type described in the aforementioned Doll patents, the response of one or more constituent two-coil systems is subtracted automatically within the coil system itself from the response of one or more of the other two-coil systems present. In accordance with the form of the invention shown in Fig. 6, this subtraction may be performed externally of the coil system by the electrical measuring equipment with the additional advantage that the dummy coil system of Figs. 4 and 4A may be dispensed with. For purposes of illustration, there is shown in Fig. 6 a typical focusing coil system comprising a plurality of receiver coils 64 and 65 disposed in fixed relation to a plurality of spaced apart transmitter coils 61, 62 and 63. To achieve focusing of a desired kind, the signals induced in the receiver coil 64 from the transmitter coils 61, 62 and 63 must be subtracted from the signals induced in the receiver coil 65 from the same transmitter coils.

According to the invention, the transmitter coils 61, 62 and 63 are continuously connected in the output circuit of the amplifier 35. The input circuit of the phase shifting means 34 is continuously switched at a convenient rate between the receiver coil 64 and the receiver coil 65 by means of a switch 68 which may be driven by the mechanical rotator 87 and controlled by the alternating current source 72. Thus, the system will oscillate at two frequencies corresponding to the two positions of the switch 68, one being a function of the electrical conductivity of the material coupling the transmitter coils 61, 62 and 63 and the receiver coil 64 (coil system I), and the second being a function of the conductivity of the material coupling the transmitter coils 61, 62 and 63 and the receiver coil 65 (coil system II).

For the desired focusing effect to be achieved according to the teachings of the aforementioned patents, it may be necessary for the conductivity response from the coil system II in a homogeneous medium to be say $x$ per cent of the conductivity response from the coil system I. Since the phase shift between the current energizing the transmitter coils and the voltage induced in the receiver coils is a function of the coil spacing as well as of the conductivity of the surrounding media, it is apparent that the conductivity frequency deviation resulting with the coil system II in the feedback path may not be $x$ per cent of that produced when the coil system I is interposed in the feed-back path. The correct relation may be established by introducing additively into the circuit of the receiver coil 65 a signal leading by 90° the transmitter coil current and of the proper magnitude to insure that the desired phase relation will obtain. For example, a suitable signal for this purpose may be furnished by a transformer 85 energized from the transmitter coil circuit and having adjustable coupling between the primary and secondary windings thereof. Alternatively, a mutual signal derived, for example, from a capacitor (not shown) energized by the transmitter coil circuit may be introduced subtractively into the circuit of the receiver coil 64.

As pointed out in connection with Fig. 4, it is desirable that the mutual signals from the two coil systems have substantially the same magnitude. In Fig. 6, this may be accomplished by properly selecting the number of turns of the coils in the coil systems I and II and by properly adjusting the coupling between the primary and secondary windings of the transformer 85. In this way, the difference between the frequencies corresponding to the interposition of the receiver coils 64 and 65, respectively, in the feed-back path, is continuously equal to the desired difference in the responses of the two coil systems and this difference may be detected in substantially the same manner as described above in connection with Fig. 4.

The invention may also be embodied in focusing coil systems illustrated in Fig. 7 which shows a coil system wherein the transmitter coil 81 and the receiver coil 82 during one switching cycle are connected in the amplifier feedback path by the switches 69 and 70 and one frequency of oscillation is obtained. During the next half cycle, the transmitter coil 83 is connected in the circuit along with the receiver coil 84, giving a second frequency proportional to the response of this second coil system. The difference in the frequencies measured at the surface thus gives the desired result. Though not shown in Fig. 7, the mutual signals should be properly adjusted as described in connection with Fig. 6.

It will be understood from the foregoing that the invention provides novel and highly effective induction logging systems for determining the electric conductivity of earth formations traversed by a bore hole. By utilizing oscillator means comprising exploring coil means disposed in a feedback path in high gain amplifying means to produce a frequency varying with the conductivity of the formations, the apparatus is simple in construction yet accurate in operation.

The several embodiments described above are merely exemplary and may be subject to many modifications within the spirit and scope of the invention as described in the appended claims. For example, various coil configurations and systems, other than those shown, can be used to obtain induction logs of the physical characteristics of the earth formations traversed by a bore hole. Further, the coil configurations shown in conjunction with the various embodiments may be interchanged. The switches are shown as being mechanical; however, it is obvious that electronic switching may be employed either in whole or in part.

I claim:

1. In apparatus for investigating an electrical property of earth formations, the combination of alternating current energized transmitter coil means and receiver coil means, means mounting said transmitter coil means and said receiver coil means for movement in proximity to said formations and maintaining said receiver coil means in fixed relation to said transmitter coil means for inductive coupling therewith such that the phase relation between the energizing current in said transmitter coil means and any voltage induced in said receiver coil means will vary as a function of the electrical conductivity of the adjacent earth formations, means including said transmitter coil means and said receiver coil means for producing the alternating current signal energizing said transmitter coil means and for causing the frequency of said alternating current signal to vary as a function of variations in said phase relation, and means for obtaining indications of the frequency of said signal as a measure of the electrical conductivity of the formations.

2. In apparatus for investigating an electrical property of earth formations, the combination of transmitter coil means and receiver coil means, means mounting said transmitter coil means and said receiver coil means for movement in proximity to said formations and maintaining said receiver coil means in fixed relation to said transmitter coil means for inductive coupling therewith through the adjacent formations, regenerative feedback path means coupling said transmitter coil means and said receiver coil means, amplifier means included in said feedback path and having sufficient gain to sustain oscillations therein, and indicating means responsive to said oscillations.

3. In apparatus for investigating an electrical property of earth formations, the combination of transmitter coil means and receiver coil means, means mounting said transmitter coil means and said receiver coil means for movement in proximity to said formations and maintaining said receiver coil means in fixed relation to said transmitter coil means for inductive coupling therewith through the adjacent formations, regenerative feedback path means coupling said transmitter coil means and said receiver coil means, amplifier means included in said feedback path and having sufficient gain to sustain oscillations therein, said feedback path providing a predetermined range of phase shifts for a corresponding range of oscillation frequencies, and indicating means responsive to said oscillations.

4. In apparatus for investigating an electrical property of earth formations, the combination of transmitter coil means and receiver coil means, means mounting said transmitter coil means and said receiver coil means for movement in proximity to said formations and maintaining said receiver coil means in fixed relation to said transmitter coil means for inductive coupling therewith through the adjacent formations, regenerative feedback path means coupling said transmitter coil means and said receiver coil means, amplifier means included in said feedback path and having sufficient gain to sustain oscillations therein, said feedback path providing a predetermined range of phase shifts for a corresponding range of oscillation frequencies such that oscillations are maintained in said range of frequencies with variations in the phase shift between said transmitter coil means and said receiver coil means through said formations, and indicating means responsive to the frequency of said oscillations.

5. In apparatus for investigating an electrical property of earth formations, the combination of transmitter coil means and receiver coil means, means mounting said transmitter coil means and said receiver coil means for movement through a bore hole and maintaining said receiver coil means in fixed relation to said transmitter coil means for zero coupling therewith in a homogeneous medium, regenerative feedback path means coupling said transmitter coil means and said receiver coil means, amplifier means included in said feedback path and having sufficient gain to sustain oscillations therein, phase shifter means in said feedback path designed to provide a range of phase shifts for a corresponding range of frequencies such that oscillations are maintained in said range of frequencies with variations in the phase shift between said transmitter coil means and said receiver coil means through said formations, means for injecting into said feedback path a constant signal in phase quadrature with the current energizing said transmitter coil means, and indicating means responsive to the frequency of said oscillations.

6. In apparatus for investigating an electrical property of earth formations traversed by a bore hole, the combination of mutual inductance coil means, means mounting said mutual inductance coil means for movement through a bore hole in inductively coupled relation to the adjacent earth formations, amplifier means, a first regenerative feedback path including said mutual inductance coil means, a second regenerative feedback path including constant phase shift means, switching means connecting said first and second feedback means selectively to couple the input and output of said amplifier means to produce a signal, and means responsive to a component of said signal.

7. In apparatus for investigating an electrical property of earth formations traversed by a bore hole, the combination of first mutual inductance coil means, means mounting said first mutual inductance coil means for movement through a bore hole in inductively coupled relation to the adjacent formations, second mutual inductance coil means having substantially the same properties as said first mutual inductance coil means but constant phase shift between the input current and output voltage thereof, amplifier means having an input circuit including phase shifting means designed to introduce phase shift varying as a function of frequency over a given range and an output circuit, first and second feedback paths including said first and second mutual inductance coil means, respectively, switching means connecting said first and second feedback paths to couple the input and output circuits of said amplifier means to produce a signal, and indicating means responsive to the difference in the frequencies of said signal obtaining in the output of said amplifier means with the respective feedback paths.

8. In apparatus for investigating an electrical property of earth formations traversed by a bore hole, the combination of first mutual inductance coil means, means mounting said first mutual inductance coil means for movement through a bore hole in inductively coupled relation to the adjacent formations, second mutual inductance coil means having substantially the same properties as said first mutual inductance coil means but constant phase shift between the input current and output voltage thereof, amplifier means having an input circuit including phase shifting means designed to introduce phase shift varying as a function of frequency over a given range and an output circuit, first switching means for connecting the output circuit of said amplifier means selectively to the inputs of said first and second mutual inductance coil means, second switching means operated in synchronism with said first switching means for connecting the input circuit of said amplifier means selectively to the outputs of said first and second mutual inductance coil means to produce a signal, and indicating means responsive to the difference in the frequencies of said signal obtaining in the output of said amplifier means with the respective mutual inductance coil means connected thereto.

9. Apparatus for the induction logging of earth formations traversed by a bore hole, comprising self-sustaining oscillating circuit means including amplifying means having input and output terminals, a first pair of coil means, means mounting said first pair of coil means for movement through a bore hole in inductively coupled relation through the earth formations surrounding the bore hole, a second pair of coil means inductively coupled exclusively of the earth formations, means connecting said output terminals to one coil means of each of said first and second pairs of inductively coupled coil means, switching means for alternately connecting the other coil means of said first and second pairs of inductively coupled coil means selectively to said input terminals to complete alternate feedback circuits for said amplifying means, means for adjusting the phase relationship in said alternate feedback circuits to sustain alternate oscillations therein, and means for measuring the difference in frequency between said alternate oscillations.

10. Apparatus for the induction logging of earth formations traversed by a bore hole, comprising self-sustaining oscillatory means including amplifying means having an input and an output, first mutual inductance coil means, means mounting said first mutual inductance coil means for movement through a bore hole adjacent the surrounding earth formations, second mutual inductance coil means mounted in fixed relation to said first coil means, means for alternately connecting said first and second coil means to form alternate closed feedback circuits with said amplifying means, means for adjusting the phase relation in said closed feedback circuits to sustain alternate oscillations therein, and means for indicating the difference in the frequencies obtaining with alternate circuits.

11. Apparatus for the induction logging of earth formations traversed by a bore hole, comprising self-sustaining oscillatory means including amplifying means having an input and an output, first mutual inductance coil means, means mounting said first mutual inductance coil means for movement through a bore hole adjacent the surrounding earth formations, second mutual inductance coil means having inductive coupling in part through the earth formations surrounding the bore hole and in part exclusively of the earth formations, means for connecting said first and second coil means alternately to form alternate closed feedback circuits for said amplifying means, means for adjusting the phase relation in said closed feedback circuits to sustain alternate oscillations therein, and means for indicating the difference in the frequencies obtaining with said alternate circuits.

12. Apparatus for the induction logging of earth formations traversed by a bore hole, comprising self-sustaining oscillatory means including amplifying means having an input and an output, first mutual inductance coil means, means mounting said first mutual inductance coil means for movement through a bore hole and to have inductive coupling through the earth formations surrounding the bore hole, second mutual inductance coil means mounted in fixed relation to said first coil means and having inductive coupling through the earth formations surrounding the bore hole, third adjustable mutual inductance coil means having inductive coupling exclusively of the earth formations, means for alternately connecting either said third coil means and one of said first and second coil means as a unit, or the other of said first and second coil means to form alternate closed feedback circuits for said amplifying means, means for adjusting the phase relation in said closed feedback circuits to sustain alternate oscillations therein, and means for indicating the difference in the frequencies obtaining with said alternate circuits.

13. Apparatus for the induction logging of earth formations traversed by a bore hole, comprising self-sustaining oscillatory means including amplifying means having an input and an output, a plurality of mutual inductance coil systems, means mounting said plurality of mutual inductance coil systems for movement through a bore hole in fixed relation and each having inductive coupling through the earth formations surrounding the bore hole, first switching means for successively connecting the inputs of said coil systems to receive the output of said amplifying means, second switching means operated in synchronism with said first switching means for successively connecting the outputs of said coil systems to provide inputs to said amplifying means and to establish alternate closed feedback circuits for said amplifying means, means for adjusting the phase relation in said alternate closed feedback circuits to sustain alternate oscillations therein, and means for indicating the difference in the frequencies obtaining said alternate feedback circuits.

References Cited in the file of this patent

UNITED STATES PATENTS

| 2,220,070 | Aiken | Nov. 5, 1940 |
| 2,225,668 | Subkow | Dec. 24, 1940 |
| 2,436,563 | Frosch | Feb. 24, 1948 |
| 2,442,805 | Gilson | June 8, 1948 |
| 2,573,137 | Greer | Oct. 30, 1951 |